United States Patent
Iwamura et al.

(10) Patent No.: US 8,355,724 B2
(45) Date of Patent: Jan. 15, 2013

(54) HANDOVER CONTROL METHOD, CELL RESELECTION METHOD AND MOBILE STATION

(75) Inventors: Mikio Iwamura, Kanagawa (JP);
Hiroaki Yamagishi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 149 days.

(21) Appl. No.: 12/934,347

(22) PCT Filed: Mar. 24, 2009

(86) PCT No.: PCT/JP2009/055797
§ 371 (c)(1), (2), (4) Date: Dec. 7, 2010

(87) PCT Pub. No.: WO2009/119565
PCT Pub. Date: Oct. 1, 2009

(65) Prior Publication Data
US 2011/0065433 A1    Mar. 17, 2011

(30) Foreign Application Priority Data
Mar. 24, 2008    (JP) .............................. P2008-076897

(51) Int. Cl.
*H04Q 7/20* (2006.01)
(52) U.S. Cl. ......... 455/439; 455/436; 455/437; 370/331
(58) Field of Classification Search .................. 455/439, 455/436, 437; 370/331
See application file for complete search history.

(56) References Cited

U.S. PATENT DOCUMENTS

| | | | |
|---|---|---|---|
| 6,009,324 A * | 12/1999 | Pravitz et al. ................. | 455/423 |
| 7,242,972 B2 * | 7/2007 | Harris ............................ | 455/574 |
| 2003/0064721 A1 * | 4/2003 | Veysset et al. ................ | 455/424 |
| 2003/0162543 A1 * | 8/2003 | Auranen et al. .............. | 455/436 |
| 2005/0192046 A1 * | 9/2005 | Harris ........................ | 455/552.1 |
| 2006/0234761 A1 * | 10/2006 | Nagasaka ................. | 455/552.1 |
| 2007/0129017 A1 * | 6/2007 | Dalsgaard et al. ......... | 455/67.11 |

FOREIGN PATENT DOCUMENTS

| | | |
|---|---|---|
| JP | 2007-129588 A | 5/2007 |
| JP | 2008-28682 A | 2/2008 |

OTHER PUBLICATIONS

International Search Report w/translation from PCT/JP2009/055797 dated Apr. 21, 2009 (4 pages).
Written Opinion from PCT/JP2009/055797 dated Apr. 21, 2010 (4 pages).
3GPP TS 25.304 V8.1.0; 3rd Generation Partnership Project; Technical Specification Group Radio Access Network; User Equipment (UE) procedures in idle mode and procedures for cell reselection in connected mode; Mar. 2008 (41 pages).

* cited by examiner

*Primary Examiner* — Danh Le
(74) *Attorney, Agent, or Firm* — Osha Liang LLP (57) ABSTRACT

A handover control method comprises a step in which a mobile station measures radio qualities in a plurality of different frequency cells at predetermined measurement intervals and a step in which the mobile station, when determining that the radio quality in a specific frequency cell satisfies a report condition, starts up a timer for the specific frequency cell and, when the timer for the specific frequency cell has expired, transmits to a radio base station a measurement report including the radio quality in the specific frequency cell. The mobile station, even when a timer for a second frequency cell has expired, does not transmit to the radio base station a measurement report including the radio quality in the second frequency cell if a timer for a first frequency cell having a higher priority than the second frequency cell is running.

18 Claims, 6 Drawing Sheets

MEASUREMENT PATTERN : SECTION A : F1, F2, F3, ...
SECTION B : F1, F2, F2, ...
SECTION C : F1, F2, F1, ...
SECTION D : F1, F2, F1, ...
SECTION E : F1, F2, F1, ... → WHEN Event Triggered Periodical Reporting IS APPLIED
SECTION E : F1, F2, F3, ... → WHEN Event Triggered Reporting IS APPLIED (WHEN Periodical IS NOT APPLIED)

FIG. 6

HANDOVER CONTROL METHOD, CELL RESELECTION METHOD AND MOBILE STATION

TECHNICAL FIELD

The present invention relates to a handover control method for performing a handover control on the mobile station by a radio base station on the basis of a measurement report transmitted from the mobile station, and to a mobile station.

The present invention also relates to a cell reselection method for reselecting a cell for performing a standby on the basis of radio qualities in multiple different frequency cells, the radio qualities being measured by the mobile station at predetermined measurement intervals, and to a mobile station.

BACKGROUND ART

In an LTE (Long Term Evolution) mobile communication system, when determining that a radio quality in a specific frequency cell satisfies a reselection criterion, a mobile station UE in an Idle state activates a timer Treselection configured to measure a period during which the radio quality in the specific frequency cell continues to satisfy the reselection criterion.

Thereafter, when the timer Treselection expires, the mobile station UE in the Idle state reselects the specific frequency cell as a cell for the mobile station UE to newly stand by.

In contrast, when detecting that the radio quality in the specific frequency cell does not satisfy the reselection criterion any more, the mobile station UE in the Idle state resets the timer Treselection.

Meanwhile, in the LTE mobile communication system, when determining that a radio quality in a specific frequency cell satisfies a reporting criterion, a mobile station UE in an RRC_Connected state activates a timer Ttrigger configured to measure a period during which the radio quality in the specific frequency cell continues to satisfy the reporting criterion.

Thereafter, when the timer Ttrigger expires, the mobile station UE in the RRC_Connected state transmits a "Measurement Report" including the radio quality in the specific frequency cell to a radio base station eNB.

In contrast, when detecting that the radio quality in the specific frequency cell does not satisfy the reporting criterion any more, the mobile station UE in the RRC_Connected state resets the timer trigger.

Meanwhile, in the LTE mobile communication system, when the mobile station UE in the Idle state can standby in multiple different frequency cells, the radio base station eNB can assign a priority for each frequency cell for the mobile station UE in the Idle state, the priority being used in cell reselection.

However, the conventional LTE mobile communication system has the following problem. Specifically, when the timer Treselection is activated for multiple frequency cells assigned different priorities, it is not clear how the mobile station UE should perform the cell reselection.

In the conventional LTE mobile communication system, it is not specified that the radio base station eNB can assign priorities to be used in transmitting a "Measurement Report." If the specification is provided, it is assumed that the same problem as the problem in the aforementioned cell reselection occurs.

DISCLOSURE OF THE INVENTION

The present invention has been made in view of the aforementioned problems. An object of the present invention is to provide a handover control method, a cell reselection method, and a mobile station for which a specification is provided to clarify, when a timer Treselection or a timer Ttrigger is activated, how the mobile station UE should perform a cell reselection or transmit a "Measurement Report" in multiple frequency cells assigned different priorities.

A first aspect of the present invention is summarized as a handover control method by which a radio base station performs a handover control on a mobile station on a basis of a measurement report transmitted from the mobile station, the method comprise measuring radio qualities in a plurality of different frequency cells by the mobile station in a predetermined measurement period when the mobile station determines that a radio quality in a specific frequency cell satisfies a reporting criterion, activating a timer for the specific frequency cell by the mobile station, the timer for the specific frequency cell being configured to measure a period during which the radio quality in the specific frequency cell continues to satisfy the reporting criterion and when the timer for the specific frequency cell expires, transmitting the measurement report to the radio base station by the mobile station, the measurement report including the radio quality in the specific frequency cell when a timer for a first frequency cell having a higher priority than a second frequency cell is active, the mobile station does not transmit the measurement report including a radio quality in the second frequency cell to the radio base station even if a timer for the second frequency cell expires.

In the first aspect, wherein when the timer for the first frequency cell expires, the mobile station transmits only the measurement report including a radio quality in the first frequency cell.

In the first aspect, wherein when the timer for the first frequency cell expires, the mobile station transmits the measurement report including a radio quality in the first frequency cell and the measurement report including the radio quality in the second frequency cell by using separate messages.

In the first aspect, wherein when the timer for the first frequency cell expires, the mobile station transmits the measurement report including a radio quality in the first frequency cell and the measurement report including the radio quality in the second frequency cell by using a same message.

In the first aspect, wherein when activating the timer for the first frequency cell or the timer for the second frequency cell, the mobile station stops measuring a radio quality in a third frequency cell having a lower priority than the first frequency cell or the second frequency cell, and starts measuring the radio quality in the first frequency cell or the second frequency cell, in a period for measuring the radio quality in the third frequency cell.

In the first aspect, wherein when the timer for the first frequency cell is stopped after the timer for the second frequency cell expires, the mobile station transmits the measurement report including the radio quality in the second frequency cell to the radio base station.

A second aspect of the present invention is summarized as a cell reselection method by which a mobile station reselects a cell for performing a standby on a basis of radio qualities in a plurality of different frequency cells, the radio qualities being measured in a predetermined measurement period, the method comprise when the mobile station determines that a radio quality in a specific frequency cell satisfies a reselection criterion, activating a timer for the specific frequency cell by the mobile station, the timer for the specific frequency cell being configured to measure a period during which the radio quality in the specific frequency cell continues to satisfy the reselection criterion and when the timer for the specific frequency cell expires, starting a standby in the specific frequency cell by the mobile station when a timer for a first frequency cell having a higher priority than a second frequency cell is active, the mobile station does not start a standby in the second frequency cell even if a timer for the second frequency cell expires.

In the second aspect, wherein when activating the timer for the first frequency cell or the timer for the second frequency cell, the mobile station stops measuring a radio quality in a third frequency cell having a lower priority than the first frequency cell or the second frequency cell and starts measuring a radio quality in the first frequency cell or the second frequency cell, in a period for measuring the radio quality in the third frequency cell.

In the second aspect, wherein when the timer for the first frequency cell is stopped after the timer for the second frequency cell expires, the mobile station starts the standby in the second frequency cell.

A third aspect of the present invention is summarized as a mobile station used in a mobile communication system configured such that a radio base station performs a handover control on the mobile station on a basis of a measurement report transmitted from the mobile station, the mobile station comprise a measurement unit configured to measure radio qualities in a plurality of different frequency cells in a predetermined measurement period and a Measurement Report transmitter unit configured to activate a timer for a specific frequency cell when the Measurement Report transmitter unit determines that a radio quality in the specific frequency cell satisfies a reporting criterion, and to transmit the measurement report to the radio base station when the timer for the specific frequency cell expires, the timer for the specific frequency cell being configured to measure a period during which the radio quality in the specific frequency cell continues to satisfy the reporting criterion, the measurement report including the radio quality in the specific frequency cell when a timer for a first frequency cell having a higher priority than a second frequency cell is active, the Measurement Report transmitter unit does not transmit the measurement report including a radio quality in the second frequency cell to the radio base station even if a timer for the second frequency cell expires.

In the third aspect, wherein when the timer for the first frequency cell expires, the Measurement Report transmitter unit transmits only the measurement report including a radio quality in the first frequency cell.

In the third aspect, wherein when the timer for the first frequency cell expires, the Measurement Report transmitter unit transmits the measurement report including a radio quality in the first frequency cell and the measurement report including the radio quality in the second frequency cell by using separate messages.

In the third aspect, wherein when the timer for the first frequency cell expires, the Measurement Report transmitter unit transmits the measurement report including a radio quality in the first frequency cell and the measurement report including the radio quality in the second frequency cell by using a same message.

In the third aspect, wherein when the Measurement Report transmitter unit activates the timer for the first frequency cell or the timer for the second frequency cell, the measurement unit stops measuring a radio quality in a third frequency cell having a lower priority than the first frequency cell or the second frequency cell, and starts measuring the radio quality in the first frequency cell or the second frequency cell, in a period for measuring the radio quality in the third frequency cell.

In the third aspect, wherein when the timer for the first frequency cell is stopped after the timer for the second frequency cell expires, the Measurement Report transmitter unit transmits the measurement report including the radio quality in the second frequency cell to the radio base station.

A fourth aspect of the present invention is summarized as A mobile station configured to reselect a cell for performing a standby on a basis of radio qualities in a plurality of different frequency cells, the radio qualities being measured in a predetermined measurement period, the mobile station comprise a measurement unit configured to measure the radio qualities in the plurality of different frequency cells in the predetermined measurement period and a cell reselector unit configured to activate a timer for a specific frequency cell when the cell reselector unit determines that a radio quality in the specific frequency cell satisfies a reselection criterion, and to start the standby in the specific frequency cell when the timer for the specific frequency cell expires, the timer for the specific frequency cell being configured to measure a period during which the radio quality in the specific frequency cell continues to satisfy the reselection criterion when a timer for a first frequency cell having a higher priority than a second frequency cell is active, the cell reselector unit does not start a standby in the second frequency cell even if a timer for the second frequency cell expires.

In the fourth aspect, wherein when the cell reselector unit activates the timer for the first frequency cell or the timer for the second frequency cell, the measurement unit stops measuring a radio quality in a third frequency cell having a lower priority than the first frequency cell or the second frequency cell and starts measuring a radio quality in the first frequency cell or the second frequency cell, in a period for measuring the radio quality in the third frequency cell.

In the fourth aspect, wherein when the timer for the first frequency cell is stopped after the timer for the second frequency cell expires, the Measurement Report transmitter unit starts the standby in the second frequency cell.

BEST MODES FOR CARRYING OUT THE INVENTION (Mobile Communication System According to First Embodiment of the Present Invention)

A description is given of a mobile communication system according to a first embodiment of the present invention by referring to FIG. 1 to FIG. 4. In this embodiment, an LTE mobile communication system is described as an example of a mobile communication system. However, the present invention is not limited to the example.

In the mobile communication system according to this embodiment, a radio base station eNB is configured to perform a handover control on a mobile station UE on the basis of a "Measurement Report" transmitted from the mobile station UE.

In addition, in the mobile communication system according to this embodiment, the mobile station UE is configured to reselect a cell for performing a standby on the basis of radio qualities in multiple different frequency cells, the qualities being measured at predetermined measurement intervals (in measurement gaps).

Figure 1:
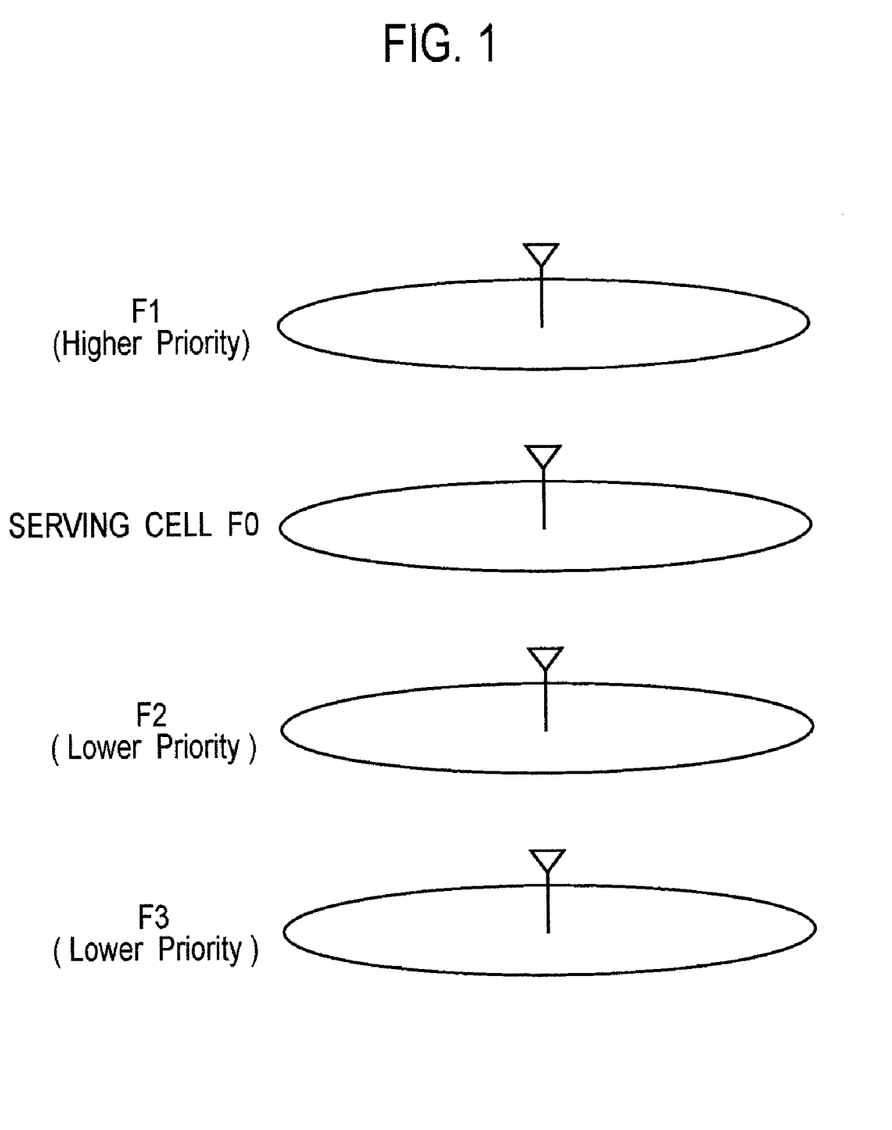
FIG. 1 is an overall configuration diagram of a mobile communication system according to a first embodiment of the present invention.

In this embodiment, a frequency cell F0, a frequency cell F1, a frequency cell F2 and a frequency cell F3 are arranged as shown in FIG. 1. Both a priority taken into consideration in reselecting a cell and a priority taken into consideration in transmitting a "Measurement Report" are higher in the order of the frequency cell F1, the frequency cell F0, the frequency cell F2 and the frequency cell F3.

Figure 2:
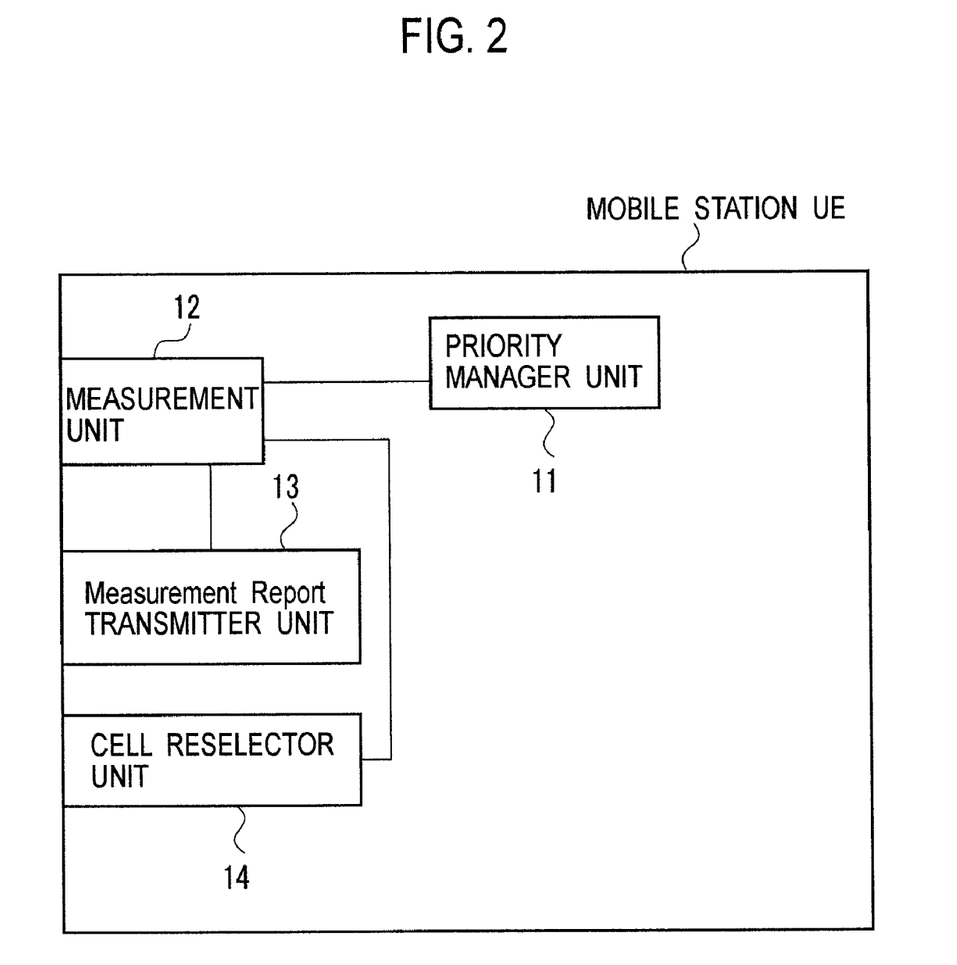
FIG. 2 is a functional block diagram of a mobile station according to the first embodiment of the present invention.

As shown in FIG. 2, the mobile station UE according to this embodiment includes a priority manager 11, a measurement unit 12, a Measurement Report transmitter 13 and a cell reselector 14.

The priority manager 11 is configured to manage, for each frequency cell, the priority taken into consideration in reselecting a cell and the priority taken into consideration in transmitting a "Measurement Report" as described above.

The measurement unit 12 is configured to measure radio qualities in multiple different frequency cells at predetermined measurement intervals (in measurement gaps).

In this embodiment, since a serving cell of the mobile station UE is the frequency cell F0 as shown in FIG. 1, the measurement unit 12 is configured to measure radio qualities in the frequency cell F1, the frequency cell F2 and the frequency cell F3 in each measurement gap, except for a case to be described later.

The Measurement Report transmitter 13 is configured to activate a timer Ttrigger for a specific frequency cell when the Measurement Report transmitter 13 determines that a radio quality in the specific frequency cell satisfies a reporting criterion. The timer Ttrigger for the specific frequency cell is configured to measure a period during which the radio quality in the specific frequency cell continues to satisfy the reporting criterion. When the timer Ttrigger for the specific frequency cell expires, the Measurement Report transmitter 13 transmits a "Measurement Report" including the radio quality in the specific frequency cell to the radio base station eNB.

The cell reselector 14 is configured to activate a timer Treselection for a specific frequency cell when the cell reselector 14 determines that a radio quality in the specific frequency cell satisfies a reselection criterion. The timer Treselection for the specific frequency cell is configured to measure a period during which the radio quality in the specific frequency cell continues to satisfy the reselection criterion. When the timer Treselection for the specific frequency cell expires, the cell reselector 14 starts a standby in the specific frequency cell.

By referring to FIG. 3 and FIG. 4, a detailed description is hereinbelow given of a method of measuring the radio qualities in the different frequency cells by the mobile station UE according to this embodiment and a method of transmitting a "Measurement Report" by the mobile station UE.

Figure 3:
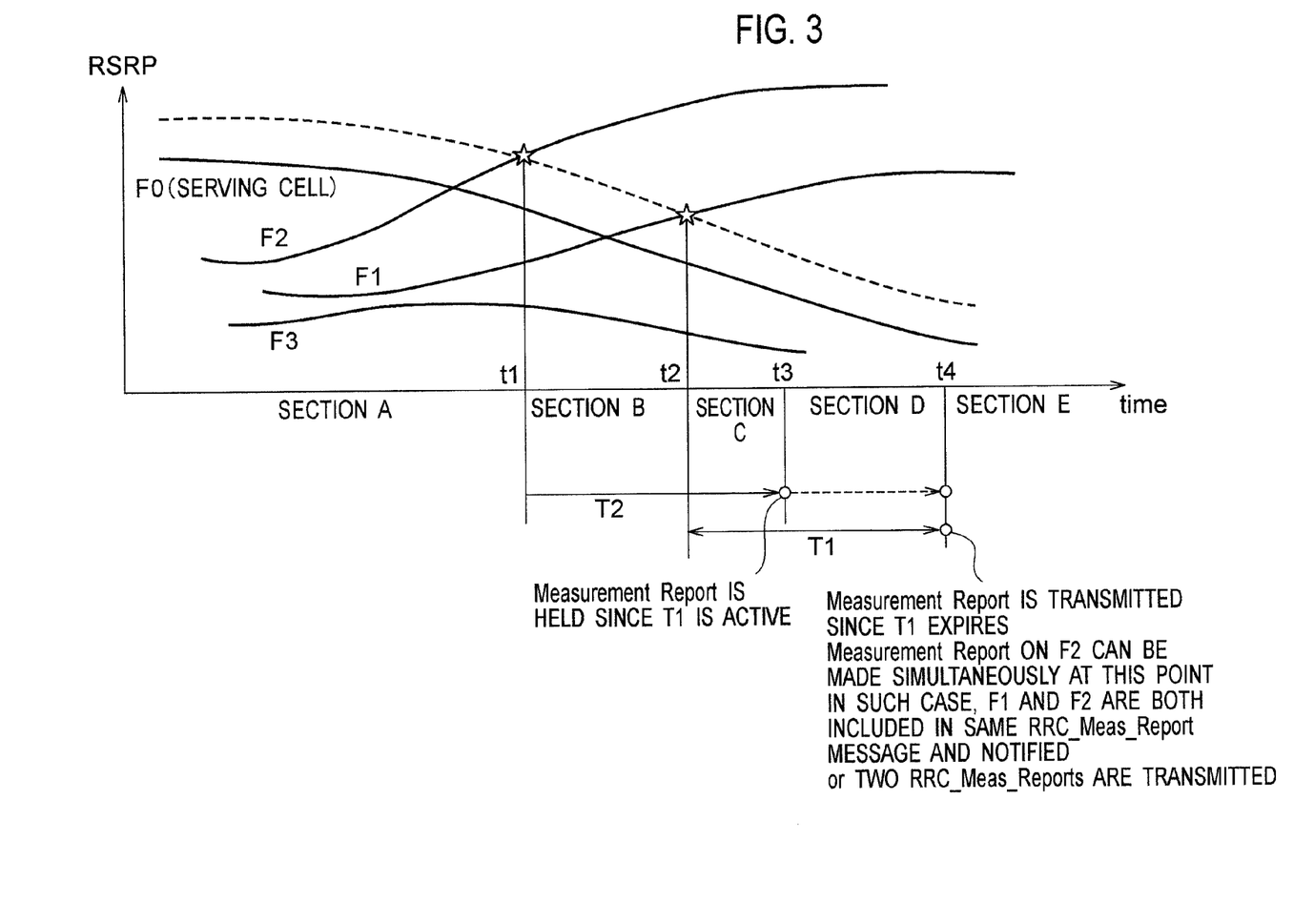
FIG. 3 is a diagram for explaining a method of measuring radio qualities in different frequency cells by the mobile station according to the first embodiment of the present invention and a method of transmitting a "Measurement Report" by the mobile station.

FIG. 3 shows temporal changes of radio qualities (RSRP: Reference Signal Received Power) in the frequency cells F0 to F3.

For example, the following five kinds of events A1 to A5 are assumable as the aforementioned reporting criterion.

(Event A1) Serving>Thresh
(Event A2) Serving<Thresh
(Event A3) Neighbour>Serving+Offset
(Event A4) Neighbour>Thresh
(Event A5) Serving<Thresh1 & Neighbour>Thresh2

"Serving" is a radio quality (RSRP) in a serving cell. "Neighbour" is a radio quality (RSRP) in a neighbouring cell of the serving cell. "Thresh," "Thresh1," and "Thresh2" are predetermined thresholds. "Offset" is a parameter for adjustment.

For example, Event A4 is used as a reporting criterion for a case where the priority of a neighbouring cell as a measurement target is higher than the priority of the serving cell. Event A5 is used as a reporting criterion for a case where the priority of the neighbouring cell as a measurement target is lower than the priority of the serving cell.

In addition, the following two kinds of transition conditions are assumable as the aforementioned reporting criterion.

(1) Neighbour>Threshx,high
(2) Serving<Threshserving & Neighbour>Threshx,high

The criterion (1) is used as a reselection criterion for a case where the priority of a neighbouring cell as a measurement target is higher than the priority of the serving cell. The criterion (2) is used as a reselection criterion for a case where the priority of the neighbouring cell as a measurement target is lower than or equal to the priority of the serving cell.

In Section A, the measurement unit 12 repeatedly measures the radio qualities in each measurement gap, in the order of the frequency cell F1, the frequency cell F2 and the frequency cell F3.

At a time point t1, the Measurement Report transmitter 13 determines that the radio quality in the frequency cell F2 (second frequency cell) satisfies any of the reporting criteria (for example, Event A5), and activates a timer T2 (second timer corresponding to the aforementioned Ttrigger) for the frequency cell F2.

In Section B, the measurement unit 12 stops measuring the radio quality in the frequency cell F3 having the lower priority than the priority of the frequency cell F2, in the measurement gap, and starts measuring the radio quality in the frequency cell F2 in a period assigned for measuring of the radio quality in the frequency cell F3.

To put it differently, in Section B, the measurement unit 12 repeatedly measures the radio qualities in the order of the frequency cell F1, the frequency cell F2 and the frequency cell F2, in the measurement gap.

Subsequently, at a time point t2, when determining that the radio quality in the frequency cell F1 (first frequency cell) having the higher priority than the frequency cell F2 (second frequency cell) satisfies any of the reporting criteria (for example, Event A4), the Measurement Report transmitter 13 activates a timer T1 (first timer corresponding to the aforementioned Ttrigger) for the frequency cell F1.

In Section C, the measurement unit 12 stops measuring the radio quality in the frequency cell F2 and starts measuring the radio quality in the frequency cell F1 in the period assigned for measuring of the radio quality in the frequency cell F3, in the measurement gap.

To put it differently, in Section C, the measurement unit 12 repeatedly measures the radio qualities in the order of the frequency cell F1, the frequency cell F2 and the frequency cell F1, in the measurement gap.

Subsequently, at a time point t3, even if the timer T2 for the frequency cell F2 expires without being reset, the Measurement Report transmitter 13 does not transmit a "Measurement Report" including the radio quality in the frequency cell F2 to the radio base station eNB. This is because the timer T1 for the frequency cell F1 having the higher priority than the frequency cell F2 is active.

Thereafter, in Section D, the measurement unit 12 repeatedly measures the radio qualities in the order of the frequency cell F1, the frequency cell F2 and the frequency cell F1, in the measurement gap.

Subsequently, at a time point t4, if the timer T1 for the frequency cell F1 expires without being reset, the Measurement Report transmitter 13 transmits a "Measurement Report" including the radio quality in the frequency cell F1 to the radio base station eNB.

Note that at the time point t4, the Measurement Report transmitter 13 may transmit a "Measurement Report" including only the radio quality in the frequency cell F1 to the radio base station eNB.

Alternatively, at the time point t4, the Measurement Report transmitter 13 may transmit the "Measurement Report" including the radio quality in the frequency cell F1 and the "Measurement Report" including the radio quality in the frequency cell F2 by using the same message (for example, an RRC message such as an "RRC_Meas_Report" message.

Still alternatively, at the time point t4, the Measurement Report transmitter 13 may transmit the "Measurement Report" including the radio quality in the frequency cell F1 and the "Measurement Report" including the radio quality in the frequency cell F2 by using separate messages (for example, RRC messages such as an "RRC_Meas_Report" message.

When "Event Triggered Periodical Reporting" is applied to the method of transmitting the "Measurement Report," the Measurement Report transmitter 13 needs to transmit the "Measurement Report" N times at maximum at predetermined reporting intervals (for example, every R1 second) even after a time point t4. Thus, in Section E, the measurement unit 12 repeatedly measures the radio qualities in the order of the frequency cell F1, the frequency cell F2 and the frequency cell F1, in the measurement gap.

In contrast, when "Event Triggered Reporting" is applied to the method of transmitting a "Measurement Report," the Measurement Report transmitter 13 transmits a "Measurement Report" at the time point t3, and thereafter in Section E, the measurement unit 12 resumes measuring the radio qualities in the frequency cells F2 and F3 in periods for measuring the radio qualities in the frequency cells F2 and F3.

Note that, in aforementioned Sections B to D, the measurement unit 12 does not have to stop measuring the radio qualities in the frequency cell F3.

Figure 4:
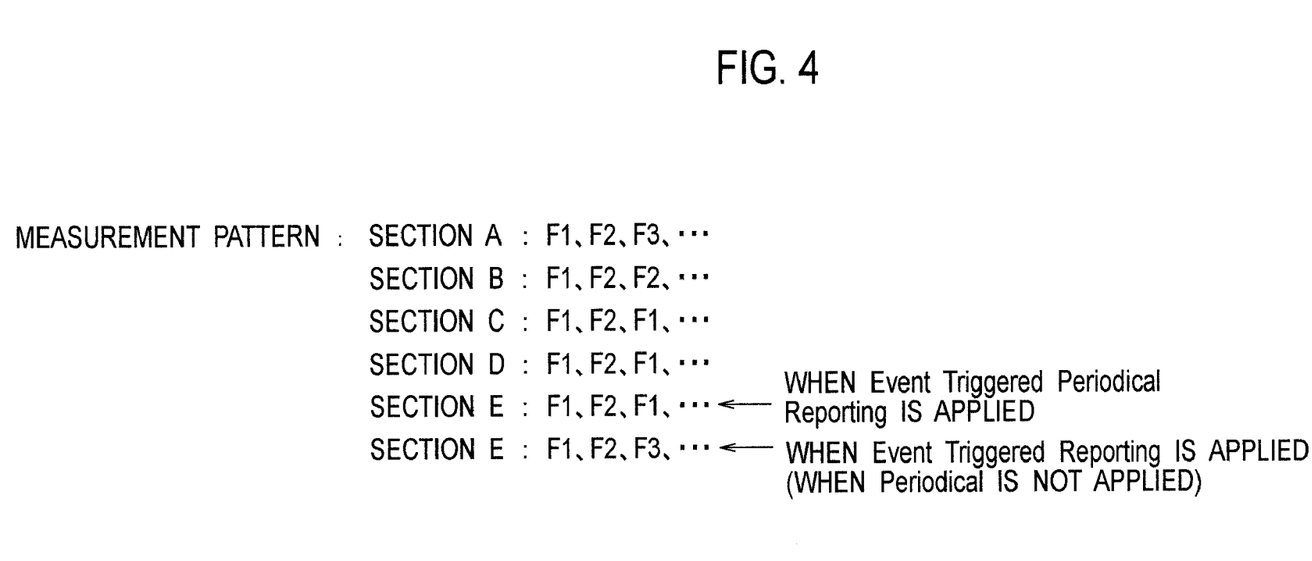
FIG. 4 is a diagram for explaining a method of measuring radio qualities in different frequency cells by a mobile station according to the first embodiment of the present invention and a method of transmitting a "Measurement Report" by the mobile station.

Similarly, by referring to FIG. 3 and FIG. 4, a description is given of the method of measuring the radio qualities in the different frequency cells by the mobile station UE according to the present embodiment and a method of reselecting a cell by the mobile station UE.

In Section A, the measurement unit 12 repeatedly measures the radio qualities in the order of the frequency cell F1, the frequency cell F2 and the frequency cell F3, in the measurement gap.

At the time point t1, the cell reselector 14 determines that the radio quality in the frequency cell F2 (second frequency cell) satisfies the reselection criterion (2), and activates the timer T2 (second timer corresponding to the aforementioned Treselection) for the frequency cell F2.

In Section B, the measurement unit 12 stops measuring the radio quality in the frequency cell F3 having the lower priority than the priority of the frequency cell F2, in the measurement gap, and starts measuring the radio quality in the frequency cell F2 in the period for measuring of the radio quality in the frequency cell F3.

To put it differently, in Section B, the measurement unit 12 repeatedly measures the radio qualities in the order of the frequency cell F1, the frequency cell F2 and the frequency cell F2, in the measurement gap.

Subsequently, at the time point t2, when determining that the radio quality in the frequency cell F1 (first frequency cell) having the higher priority than the frequency cell F2 (second frequency cell) satisfies the reselection criterion (1), the cell reselector 14 activates the timer T1 (first timer corresponding to the aforementioned Treselection) for the frequency cell F1.

In Section C, the measurement unit 12 stops measuring the radio quality in the frequency cell F2 and starts measuring the radio quality in the frequency cell F1 in the period assigned for measuring of the radio quality in the frequency cell F3, in the measurement gap.

To put it differently, in Section C, the measurement unit 12 repeatedly measures the radio qualities in the order of the frequency cell F1, the frequency cell F2 and the frequency cell F1, in the measurement gap.

Subsequently, at the time point t3, even if the timer T2 for the frequency cell F2 expires without being reset, the cell reselector 14 does not start a standby in the frequency cell F2. This is because the timer T1 for the frequency cell F1 having the higher priority than the frequency cell F2 is active.

Thereafter, in Section D, the measurement unit 12 repeatedly measures the radio qualities in the order of the frequency cell F1, the frequency cell F2 and the frequency cell F1, in the measurement gap.

Subsequently, at the time point t4, if the timer T1 for the frequency cell F1 expires without being reset, the cell reselector 14 starts a standby in the frequency cell F1.

In the mobile communication system according to the first embodiment of the present invention, the mobile station UE is configured as follows. When the timer T1 for the frequency cell F1 having the higher priority is active, the mobile station UE does not transmit the "Measurement Report" including the radio quality in the frequency cell F2 even if the timer T2 for the frequency cell F2 is active. Accordingly, the mobile station UE can perform a handover to a frequency cell having a higher priority.

Furthermore, in the mobile communication system according to the first embodiment of the present invention, the mobile station UE is configured as follows. When the timer T1 for the frequency cell F1 having the higher priority is active, the mobile station UE does not start a standby in the frequency cell F2 even if the timer T2 for the frequency cell F2 is active. Accordingly, the mobile station UE can perform a cell reselection on a frequency cell having a higher priority.

(Mobile Communication System According to Second Embodiment of the Present Invention)

A mobile communication system according to a second embodiment of the present invention will be described by referring to FIG. 5 and FIG. 6. Hereinbelow, the description is given of the mobile communication system according to the second embodiment of the present invention, focused on a difference from the mobile communication system according to the first embodiment of the present invention.

Figure 5:
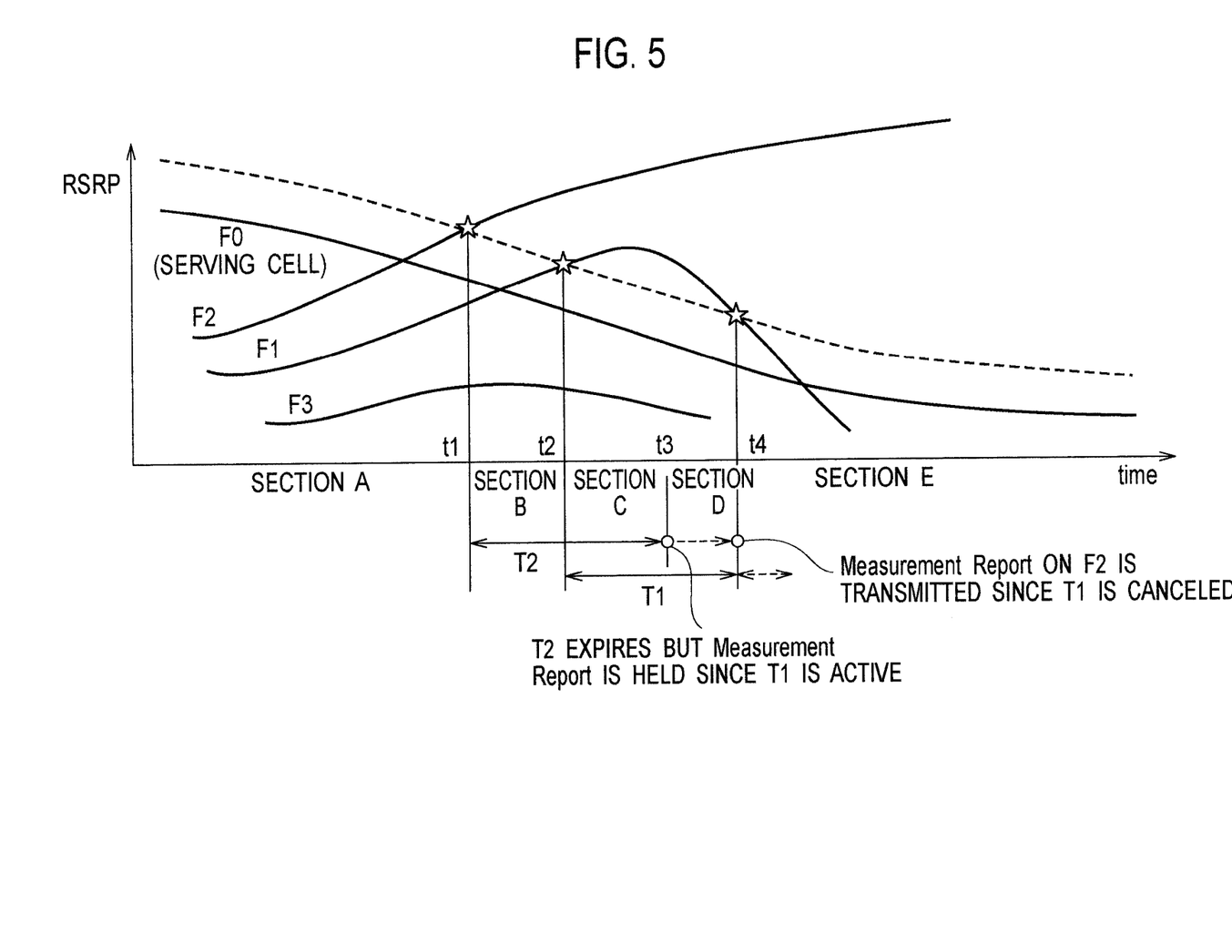
FIG. 5 is a is a diagram for explaining the method of measuring the radio qualities in the different frequency cells by the mobile station according to a second embodiment of the present invention and the method of transmitting a "Measurement Report" by the mobile station.
Figure 6:
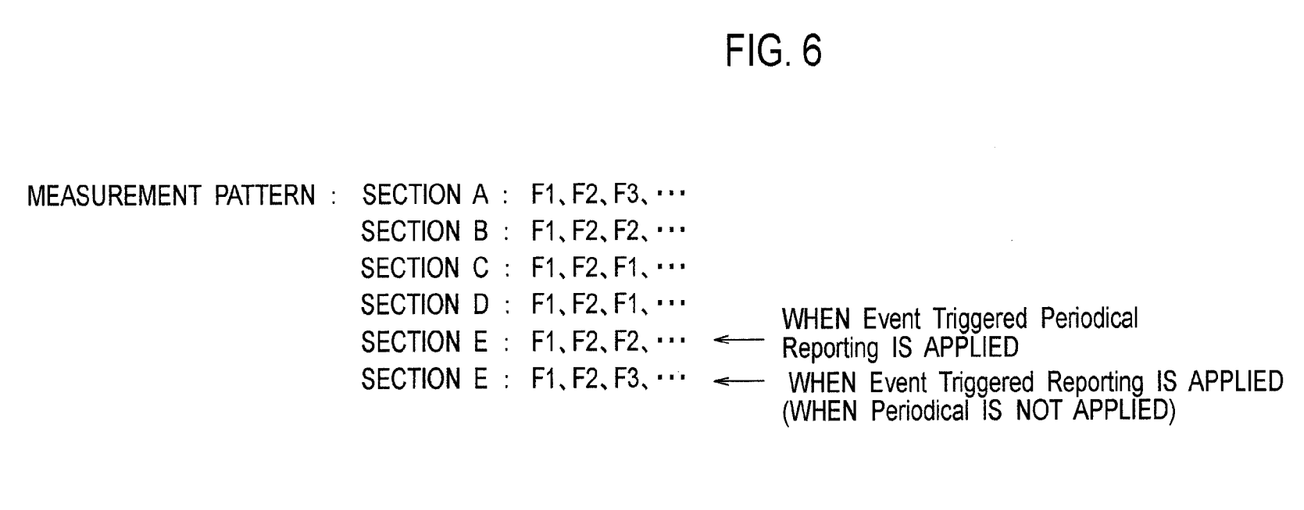
FIG. 6 is a diagram for explaining the method of measuring the radio qualities in the different frequency cells by the mobile station according to the second embodiment of the present invention and the method of transmitting a "Measurement Report" by the mobile station.

Firstly, by referring to FIG. 5 and FIG. 6, a detailed description is given of a method of measuring radio qualities in different frequency cells by a mobile station UE according to this embodiment and a method of transmitting a "Measurement Report" by the mobile station UE.

In Section A, the measurement unit 12 repeatedly measures the radio qualities in the order of the frequency cell F1, the frequency cell F2 and the frequency cell F3, in the measurement gap.

At a time point t1, the Measurement Report transmitter 13 determines that the radio quality in the frequency cell F2 (second frequency cell) satisfies any of the reporting criteria (for example, Event A5), and activates the timer T2 (second timer corresponding to the aforementioned Ttrigger) for the frequency cell F2.

In Section B, the measurement unit 12 stops measuring the radio quality in the frequency cell F3 having the lower priority than the priority of the frequency cell F2, in the measurement gap, and starts measuring the radio quality in the frequency cell F2 in a period for measuring of the radio quality in the frequency cell F3.

To put it differently, in Section B, the measurement unit 12 repeatedly measures the radio qualities in the order of the frequency cell F1, the frequency cell F2 and the frequency cell F2, in the measurement gap.

Subsequently, at the time point t3, when determining that the radio quality in the frequency cell F1 (first frequency cell) having the higher priority than the frequency cell F2 (second frequency cell) satisfies any of the reporting criteria (for example, Event A4), the Measurement Report transmitter 13 activates the timer T1 (first timer corresponding to the aforementioned Ttrigger) for the frequency cell F1.

In Section C, the measurement unit 12 stops measuring the radio quality in the frequency cell F2 and starts measuring the radio quality in the frequency cell F1 in a period assigned for measuring of the radio quality in the frequency cell F3, in the measurement gap.

To put it differently, in Section C, the measurement unit 12 repeatedly measures the radio qualities in the order of the frequency cell F1, the frequency cell F2 and the frequency cell F1, in the measurement gap.

Subsequently, at a time point t3, even if the timer T2 for the frequency cell F2 expires without being reset, the Measurement Report transmitter 13 does not transmit a "Measurement Report" including the radio quality in the frequency cell F2 to the radio base station eNB. This is because the timer T1 for the frequency cell F1 having the higher priority than the frequency cell F2 is active.

Thereafter, in Section D, the measurement unit 12 repeatedly measures the radio qualities in the order of the frequency cell F1, the frequency cell F2 and the frequency cell F1, in the measurement gap.

Subsequently, at a time point t4, when the timer T1 for the frequency cell F1 is reset because the radio quality in the frequency cell F1 does not satisfy the measurement criterion any more, the Measurement Report transmitter 13 transmits the "Measurement Report" including the radio quality in the frequency cell F2 to the radio base station eNB.

When "Event Triggered Periodical Reporting" is applied to the method of transmitting the "Measurement Report," the Measurement Report transmitter 13 needs to transmit the "Measurement Report" N times at maximum at predetermined reporting intervals (for example, every R1 second) even after a time point t4. Thus, in Section E, the measurement unit 12 repeatedly measures the radio qualities in the order of the frequency cell F1, the frequency cell F2 and the frequency cell F2, in the measurement gap.

In contrast, when "Event Triggered Reporting" is applied to the method of transmitting the "Measurement Report," the Measurement Report transmitter 13 transmits the "Measurement Report" at the time point t3, and thereafter in Section E, the measurement unit 12 resumes measuring the radio qualities in the frequency cells F2 and F3 in periods for measuring the radio qualities in the frequency cells F2 and F3.

Note that, in aforementioned Sections B to D, the measurement unit 12 does not have to stop measuring the radio quality in the frequency cell F3.

Secondly, by referring to FIG. 5 and FIG. 6, a description is given of the method of measuring the radio qualities in the different frequency cells by the mobile station UE according to the present embodiment and a method of reselecting a cell by the mobile station UE.

In Section A, the measurement unit 12 repeatedly measures the radio qualities in the order of the frequency cell F1, the frequency cell F2 and the frequency cell F3, in the measurement gap.

At the time point t1, the cell reselector 14 determines that the radio quality in the frequency cell F2 (second frequency cell) satisfies the reselection criterion (2), and activates the timer T2 (second timer corresponding to the aforementioned Treselection) for the frequency cell F2.

In Section B, the measurement unit 12 stops measuring the radio quality in the frequency cell F3 having the lower priority than the priority of the frequency cell F2, in the measurement gap, and starts measuring the radio quality in the frequency cell F2 in the period for measuring of the radio quality in the frequency cell F3.

To put it differently, in Section B, the measurement unit 12 repeatedly measures the radio qualities in the order of the frequency cell F1, the frequency cell F2 and the frequency cell F2, in the measurement gap.

Subsequently, at the time point t2, when determining that the radio quality in the frequency cell F1 (first frequency cell) having the higher priority than the frequency cell F2 (second frequency cell) satisfies the reselection criterion (1), the cell reselector 14 activates the timer T1 (first timer corresponding to the aforementioned Treselection) for the frequency cell F1.

In Section C, the measurement unit 12 stops measuring the radio quality in the frequency cell F2 and starts measuring the radio quality in the frequency cell F1 in the period assigned for measuring of the radio quality in the frequency cell F3, in the measurement gap.

To put it differently, in Section C, the measurement unit 12 repeatedly measures the radio qualities in the order of the frequency cell F1, the frequency cell F2 and the frequency cell F1, in the measurement gap.

Subsequently, at the time point t3, even if the timer T2 for the frequency cell F2 expires without being reset, the cell reselector 14 does not start a standby in the frequency cell F2. This is because the timer T1 for the frequency cell F1 having the higher priority than the frequency cell F2 is active.

Thereafter, in Section D, the measurement unit 12 repeatedly measures the radio qualities in the order of the frequency cell F1, the frequency cell F2 and the frequency cell F1, in the measurement gap.

Subsequently, at the time point t4, when the timer T1 for the frequency cell F1 is reset because the radio quality in the frequency cell F1 does not satisfy the reselection criterion (1) any more, the cell reselector 14 starts a standby in the frequency cell F2.

MODIFICATION EXAMPLE

Note that the present invention is applicable to a case of Inter-RAT measurement. In this case, it is possible to obtain the same effects as in the case of the aforementioned different frequency measurements.

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

All content of the Japanese patent application 2008-76897 (Filing date is 24 Mar. 2008) are described into this application by the reference.

Industrial Applicability

As described above, according to the present invention, it is possible to provide a handover control method, a cell reselection method, and a mobile station for which a specification is provided to clarify, when a timer Treselection or a timer Ttrigger is activated, how the mobile station UE should perform a cell reselection or transmit a "Measurement Report" in multiple frequency cells assigned different priorities.

The invention claimed is:

1. A handover control method by which a radio base station performs a handover control on a mobile station on a basis of a measurement report transmitted from the mobile station, the method comprising the steps of:
    measuring radio qualities in a plurality of different frequency cells by the mobile station in a predetermined measurement period;
    when the mobile station determines that a radio quality in a specific frequency cell satisfies a reporting criterion, activating a timer for the specific frequency cell by the mobile station, the timer for the specific frequency cell being configured to measure a period during which the radio quality in the specific frequency cell continues to satisfy the reporting criterion; and
    when the timer for the specific frequency cell expires, transmitting the measurement report to the radio base station by the mobile station, the measurement report including the radio quality in the specific frequency cell, wherein
    when a timer for a first frequency cell having a higher priority than a second frequency cell is active, the mobile station does not transmit the measurement report including a radio quality in the second frequency cell to the radio base station even if a timer for the second frequency cell expires.

2. The handover control method according to claim 1, wherein when the timer for the first frequency cell expires, the mobile station transmits only the measurement report including a radio quality in the first frequency cell.

3. The handover control method according to claim 1, wherein when the timer for the first frequency cell expires, the mobile station transmits the measurement report including a radio quality in the first frequency cell and the measurement report including the radio quality in the second frequency cell by using separate messages.

4. The handover control method according to claim 1, wherein when the timer for the first frequency cell expires, the mobile station transmits the measurement report including a radio quality in the first frequency cell and the measurement report including the radio quality in the second frequency cell by using a same message.

5. The handover control method according to claim 1, wherein when activating the timer for the first frequency cell or the timer for the second frequency cell, the mobile station stops measuring a radio quality in a third frequency cell having a lower priority than the first frequency cell or the second frequency cell, and starts measuring the radio quality in the first frequency cell or the second frequency cell, in a period for measuring the radio quality in the third frequency cell.

6. The handover control method according to claim 1, wherein when the timer for the first frequency cell is stopped after the timer for the second frequency cell expires, the mobile station transmits the measurement report including the radio quality in the second frequency cell to the radio base station.

7. A cell reselection method by which a mobile station reselects a cell for performing a standby on a basis of radio qualities in a plurality of different frequency cells, the radio qualities being measured in a predetermined measurement period, the method comprising the steps of:
    when the mobile station determines that a radio quality in a specific frequency cell satisfies a reselection criterion, activating a timer for the specific frequency cell by the mobile station, the timer for the specific frequency cell being configured to measure a period during which the radio quality in the specific frequency cell continues to satisfy the reselection criterion; and
    when the timer for the specific frequency cell expires, starting a standby in the specific frequency cell by the mobile station, wherein
    when a timer for a first frequency cell having a higher priority than a second frequency cell is active, the mobile station does not start a standby in the second frequency cell even if a timer for the second frequency cell expires.

8. The cell reselection method according to claim 7, wherein when activating the timer for the first frequency cell or the timer for the second frequency cell, the mobile station stops measuring a radio quality in a third frequency cell having a lower priority than the first frequency cell or the second frequency cell and starts measuring a radio quality in the first frequency cell or the second frequency cell, in a period for measuring the radio quality in the third frequency cell.

9. The cell reselection method according to claim 7, wherein when the timer for the first frequency cell is stopped after the timer for the second frequency cell expires, the mobile station starts the standby in the second frequency cell.

10. A mobile station used in a mobile communication system configured such that a radio base station performs a handover control on the mobile station on a basis of a measurement report transmitted from the mobile station, the mobile station comprising:
  a measurement unit configured to measure radio qualities in a plurality of different frequency cells in a predetermined measurement period; and
  a measurement report transmitter configured to activate a timer for a specific frequency cell when the measurement report transmitter determines that a radio quality in the specific frequency cell satisfies a reporting criterion, and to transmit the measurement report to the radio base station when the timer for the specific frequency cell expires, the timer for the specific frequency cell being configured to measure a period during which the radio quality in the specific frequency cell continues to satisfy the reporting criterion, the measurement report including the radio quality in the specific frequency cell, wherein
  when a timer for a first frequency cell having a higher priority than a second frequency cell is active, the measurement report transmitter does not transmit the measurement report including a radio quality in the second frequency cell to the radio base station even if a timer for the second frequency cell expires.

11. The mobile station according to claim 10, wherein when the timer for the first frequency cell expires, the measurement report transmitter transmits only the measurement report including a radio quality in the first frequency cell.

12. The mobile station according to claim 10, wherein when the timer for the first frequency cell expires, the measurement report transmitter transmits the measurement report including a radio quality in the first frequency cell and the measurement report including the radio quality in the second frequency cell by using separate messages.

13. The mobile station according to claim 10, wherein when the timer for the first frequency cell expires, the measurement report transmitter transmits the measurement report including a radio quality in the first frequency cell and the measurement report including the radio quality in the second frequency cell by using a same message.

14. The mobile station according to claim 10, wherein when the measurement report transmitter activates the timer for the first frequency cell or the timer for the second frequency cell, the measurement unit stops measuring a radio quality in a third frequency cell having a lower priority than the first frequency cell or the second frequency cell, and starts measuring the radio quality in the first frequency cell or the second frequency cell, in a period for measuring the radio quality in the third frequency cell.

15. The mobile station according to claim 10, wherein when the timer for the first frequency cell is stopped after the timer for the second frequency cell expires, the measurement report transmitter transmits the measurement report including the radio quality in the second frequency cell to the radio base station.

16. A mobile station configured to reselect a cell for performing a standby on a basis of radio qualities in a plurality of different frequency cells, the radio qualities being measured in a predetermined measurement period, the mobile station comprising:
  a measurement unit configured to measure the radio qualities in the plurality of different frequency cells in the predetermined measurement period; and
  a cell reselector configured to activate a timer for a specific frequency cell when the cell reselector determines that a radio quality in the specific frequency cell satisfies a reselection criterion, and to start the standby in the specific frequency cell when the timer for the specific frequency cell expires, the timer for the specific frequency cell being configured to measure a period during which the radio quality in the specific frequency cell continues to satisfy the reselection criterion, wherein
  when a timer for a first frequency cell having a higher priority than a second frequency cell is active, the cell reselector does not start a standby in the second frequency cell even if a timer for the second frequency cell expires.

17. The mobile station according to claim 16, wherein when the cell reselector activates the timer for the first frequency cell or the timer for the second frequency cell, the measurement unit stops measuring a radio quality in a third frequency cell having a lower priority than the first frequency cell or the second frequency cell and starts measuring a radio quality in the first frequency cell or the second frequency cell, in a period for measuring the radio quality in the third frequency cell.

18. The mobile station according to claim 16, wherein when the timer for the first frequency cell is stopped after the timer for the second frequency cell expires, the cell reselector unit starts the standby in the second frequency cell.

* * * * *